United States Patent
McCarthy

(10) Patent No.: US 6,296,693 B1
(45) Date of Patent: Oct. 2, 2001

(54) LIFE CELL

(76) Inventor: Walton W. McCarthy, 222 Blakes Hill Rd., Northwood, NH (US) 03261

( * ) Notice: Subject to any disclaimer, the term of this patent is extended or adjusted under 35 U.S.C. 154(b) by 0 days.

(21) Appl. No.: 09/398,572

(22) Filed: Sep. 17, 1999

(51) Int. Cl.[7] .......................... B01D 53/04; B01D 53/34
(52) U.S. Cl. ........................ 96/117.5; 96/132; 96/135; 96/142; 96/153; 96/223; 96/226
(58) Field of Search .................. 96/111, 117, 117.5, 96/127, 128, 131–133, 135, 136, 140, 142, 147, 153, 154, 223, 226

(56) References Cited

U.S. PATENT DOCUMENTS

| | | | |
|---|---|---|---|
| 2,578,324 | * 12/1951 | Southwick, Jr. | 96/153 |
| 3,015,367 | * 1/1962 | Smith et al. | 96/135 |
| 3,608,280 | * 9/1971 | Martin | 96/140 |
| 4,210,429 | * 7/1980 | Golstein | 96/142 |
| 4,337,071 | * 6/1982 | Yang | 62/37 |
| 4,534,775 | * 8/1985 | Frazier | 96/154 X |
| 4,629,479 | * 12/1986 | Cantoni | 96/142 X |
| 4,658,707 | * 4/1987 | Hawkins et al. | 96/111 X |
| 4,701,195 | * 10/1987 | Rosendall | 96/136 |
| 4,732,579 | * 3/1988 | Veltman et al. | 96/128 X |
| 4,737,173 | * 4/1988 | Kudirka et al. | 96/153 X |
| 4,793,832 | * 12/1988 | Veltman et al. | 96/128 X |
| 4,801,311 | * 1/1989 | Tolles | 96/153 X |
| 5,207,877 | * 5/1993 | Weinberg et al. | 204/130 |
| 5,288,298 | * 2/1994 | Aston | 96/135 |
| 5,399,319 | * 3/1995 | Schoenberger et al. | 422/121 |
| 5,626,820 | * 5/1997 | Kinkead et al. | 422/122 |
| 5,641,343 | * 6/1997 | Frey | 96/135 |
| 5,685,895 | * 11/1997 | Hagiwara et al. | 96/117 |
| 5,853,457 | * 12/1998 | Eysmondt et al. | 96/111 X |

FOREIGN PATENT DOCUMENTS 63-077517A * 4/1988 (JP) ........................................ 96/135

* cited by examiner

Primary Examiner—Robert H. Spitzer
(74) Attorney, Agent, or Firm—Michael J. Persson; Lawson, Philpot & Persson; Randolph H. Cook

(57) ABSTRACT

A life cell for use in a disaster and a filtration system utilized with such a life cell. The life cell includes a contaminant detector, for detecting the presence of a contaminant in a volume of air, and an air filtration system for removing contaminants from the volume of air. The air filtration system of the life cell includes an air inlet, HEPA filter in fluid communication with the air inlet for removing particulate contaminants from the volume of air, and a carbon filter in fluid connection with the HEPA filter for removing chemical and biological contaminants from the volume of air. A blower is placed in fluid communication with the carbon filter and HEPA filter and acts to draw the volume of air from the air inlet, through the HEPA filter and carbon filter, and exhaust the volume of air such that a positive pressure is created. The preferred life cell includes a carbon filter made up of two layers of foam, an activated carbon filter medium, and a Whetlerite carbon filter medium. The preferred life cell is disposed within a self-contained housing and includes a battery bank, a light, a radio, and a communications device.

20 Claims, 4 Drawing Sheets

LIFE CELL

FIELD OF THE INVENTION

The present invention relates to the field of disaster survival equipment and, in particular, to a filtration unit, and self contained life cell utilizing the same, that filters contaminated air entering a room in the event of a disaster.

BACKGROUND OF THE INVENTION

In spite of a large amount of misinformation which has been presented to the public, there is convincing scientific and technical information available that it is possible for most people to survive a full scale exchange of nuclear, biological or chemical weapons, or disaster caused by an industrial accident provided that proper advance preparations are made.

It is acknowledged that there would be little incentive for an individual to survive such a nuclear holocaust or biological disaster if, as a result, all life on earth were doomed to extinction or marginal existence. However, the National Academy of Sciences (NAS) has produced extensive reports on the atmospheric effects from various war scenarios, which contradict any such idea. In reality, therefore, the question today is not whether persons can survive a nuclear, biological. and chemical warfare or disaster agents, but whether people have the will and determination to prepare for survival.

A number of underground disaster shelters have been developed in preparation of such a disaster. The typical backyard, or personal, shelter has the capability of providing shelter for a small number of people, such as a family unit and incorporates features to protect its occupants against some of the effects of nuclear weapons. However, these shelters have a number of drawbacks. First, the shelter must be placed within the ground and, therefore, cannot be used by people who live in apartments or condominiums. Second, these shelters require leaving ones home in order to access the shelter, one is exposed to hazards from breathing in contaminated air while walking to the shelter. Further, biological contaminants in vapor may enter the body via membrane in the eye, or openings in the skin, and may attach to clothing and therefore infect all inhabitants of the shelter within hours. Finally. the cost of such shelters is relatively high and, therefore, the purchase of such a shelter is beyond the means of many people.

Given the inappropriateness of shelters in all situations, an alternative means of survival is necessary. In cases of nuclear disasters, survival means other than an underground shelter will most likely be ineffective if the occupants are in proximity of the blast zone. However, in cases where people are outside of the blast zone, but within the fallout zone, or in cases of biological or chemical disaster, the primary need is for a means of insuring that the air is free of these contaminants.

A number of air purification systems have been designed to filter the air in a room in order to remove contaminants from breathable air. For example, U.S. Pat. No. 5,207,877 issued May 3, 1993, describes a method for the purification of air in which air polluted with potentially harmful chemical and biological matter is purified and pollutants degraded to less hazardous substances by a combined chemical and electrical process.

Although this invention purifies and destroys most potentially harmful airborne chemicals, microorganisms and other biologicals both chemical and electrochemical means, it has a number of drawbacks. First, the system does filter harmful nuclear fallout, and therefore is ineffective in the event of a nuclear disaster. Second, it directed at purifying the air in a room where a known contaminant is found and therefore, neither filters incoming air nor maintains a closed environment to prevent outside air from entering a room. Third, the electrochemical reaction utilized by this system relies on available ions and bondable compounds to attract the hazardous and undesirable contaminants. Accordingly, this method will eventually cease to function properly due to the lack of available bondable ions and compounds. In such an event, the filtration system will not function properly unless the used chemicals are removed and fresh chemical replenished. Finally, the need to remove and replenish chemicals creates another potential hazard for the average person due to the risk of accidents during handling and storage of the spent and unspent chemical. For these reasons this method of air purification is not suitable for use in protecting from nuclear, biological and chemical disasters.

U.S. Pat. No. 4,337,071 issued Jun. 29, 1982 describes an on-site apparatus that produces cryogenic temperatures used to remove, by condensations all pollutants in the air so that an ultra clean air supply is obtained for human consumption in the interior of living enclosures, such as automobiles, homes, offices, hospitals etc. The apparatus can recycle air in the enclosure, i.e. resupply the oxygen consumed by the human being and remove the carbon dioxide produced by respiration. Cold traps (filters) of different cryogenic temperatures are built into the system to condense the pollutants of different condensation temperatures. The condensed pollutants can be disposed of by periodical defrost and purge of the system.

Although this system would allow a sealed room to maintain breathable atmosphere, it also has a number of drawbacks. First, this system does not contain a filter capable of removing nuclear fallout, biological hazards and dangerous chemicals from the air. Second, this system maintains a closed environment by recycling air, the system does not accomplish the decontamination process which is crucial for maintaining a safe environment in the event of a full scale exchange of nuclear, biological or chemical weapons, or disaster caused by an industrial accident. Third, the large amount of power required to maintain the temperatures required by these systems cannot be supplied for long by existing battery systems. Therefore, such a system will be ineffective in circumstances where power is out. U.S. Pat. No. 5,626,820 issued May 6, 1997 describes a clean room air-filtering device. This device features a clean room and chemical air filter suitable for use in the air handling system of the clean room directly upstream of high-efficiency particulate air (HEPA) filters. This device includes a HEPA filter (high efficiency particulate air filter), in addition to chemical filters targeted for the removal of the specific contaminants contained in the various air streams inside a clean room. The clean room air filter is designed to remove chemicals and other gas-phase contaminants created from within the clean room itself during the regular activities occurring in the manufacture of semiconductor devices. In addition, this device includes a processing station that generates a gas-phase contaminant in which the activated carbon particles are preferably selected to remove contaminant produced by the processing station.

This system is also ill suited for use in disaster situations. First, this air handling system preferably includes a make-up air system for drawing air from an atmosphere outside of the clean room, and is subject to contamination by an ambient contaminant. As this make-up air is made to air is passed through borosilicate filter material, rather than more efficient HEPA and/or charcoal filters, this make-up air may act to contaminate the interior air. Second, as this filter is directed to preventing dust and other airborne contaminants from interfering with manufacturing operations, it is not suited for the protection of humans from nuclear fallout, chemical or biological disasters that occur outside the processing station. Finally, this system does not include any means of determining whether contaminants are present within the air entering the system and, therefore, would need to be continuously employed to be effective.

U.S. Pat. No. 5,399,319 issued Mar. 21, 1995 describes a portable, convertible apparatus for creating either a negative pressure or a positive pressure in and filtering the air in a room. Within the airflow path, HEPA filter is located in the device. This device will maintain a negative pressure in a room thereby preventing the air from inside the room where the device is active from escaping the room. Allowing only non infected air from outside the room to enter the room where the device is located. Alternatively, the device can function to maintain clean air inside a room so that if a door in the room opens, clean air will rush out of the room thereby preventing contaminated air from rushing into the room.

Although this device is useful in creating either a positive or negative pressure inside a room and thus maintaining either the desired clean air or infected air inside a room, the device does not filter air from the outside. This device contains one filter, a HEPA filter, that is capable of removing small quantities of contaminants that accidental entered the room, but is not useful in removing contaminants from the air outside of the room. This device does not take air directly from the atmosphere, or outside of the room, and filter contamination, rather the device filters only that air already present in the closed room. Therefore, it is not designed to maintain a clean air environment for an undefined period of time and provide adequate air for human survival. Finally, this device would not provide human protection from atmospheric contaminants in the event of a nuclear, biological or chemical attack or accident.

Therefore, there is a need for a filtration system, and life cell utilizing the same, that provides human protection from atmospheric contaminants in the event of a nuclear, biological or chemical attack or accident, that does not require the use of an underground shelter, that filters air directly from the atmosphere, that may be effectively operated by batteries, that includes a means for determining whether contaminants are present within the air entering the system, and that does not require that used chemicals are removed and fresh chemical replenished.

SUMMARY OF THE INVENTION

The present invention is a life cell for use in a disaster and a filtration system utilized with such a life cell. The life cell includes a contaminant detector, for detecting the presence of a contaminant in a volume of air, and an air filtration system for removing contaminants from the volume of air. The air filtration system of the lifecell includes an air inlet, a highly effective particular air filter (hereafter "HEPA filter") in fluid communication with the air inlet for removing particulate contaminants from said volume of air, and a carbon filter in fluid connection with the HEPA filter for removing chemical and biological contaminants from the volume of air. A blower is placed in fluid communication with the carbon filter and HEPA filter and acts to draw the volume of air from the air inlet, through the HEPA filter and carbon filter, and exhaust the volume of air such that a positive pressure is created. The preferred embodiment of the life cell is disposed within a self-contained housing and includes a battery bank, a light, a radio, and a communications device.

The preferred air filtration system removes contaminants, resulting from a nuclear, biological or chemical attack or accident, from a volume of air. The preferred air filtration system includes a carbon filter that includes two layers of open cell foam, an activated carbon filter, and a Whetlerite carbon filter. It is preferred that the layers of foam, activated carbon filter, and Whetlerite carbon filter be arranged in parallel relation to one another and separated by layers of paper filter cloth. However, in other embodiments the foam and filters may be arranged in separate compartments, or arranged together in a different configuration.

Therefore, it is an aspect of the invention to provide a filtration system and life cell that provides human protection from atmospheric contaminants in the event of a nuclear, biological or chemical attack or accident.

It is a further aspect of the invention to provide a filtration system and life cell that does not require the use of an underground shelter.

It is a further aspect of the invention to provide a filtration system and life cell that filters air directly from the atmosphere.

It is a further aspect of the invention to provide a filtration system and life cell that may be effectively operated by batteries.

It is a further aspect of the invention to provide a filtration system and life cell that includes a means for determining whether contaminants are present within the air entering the system.

It is a still further aspect of the invention to provide a filtration system and life cell that does not require that used chemicals are removed and fresh chemical replenished.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
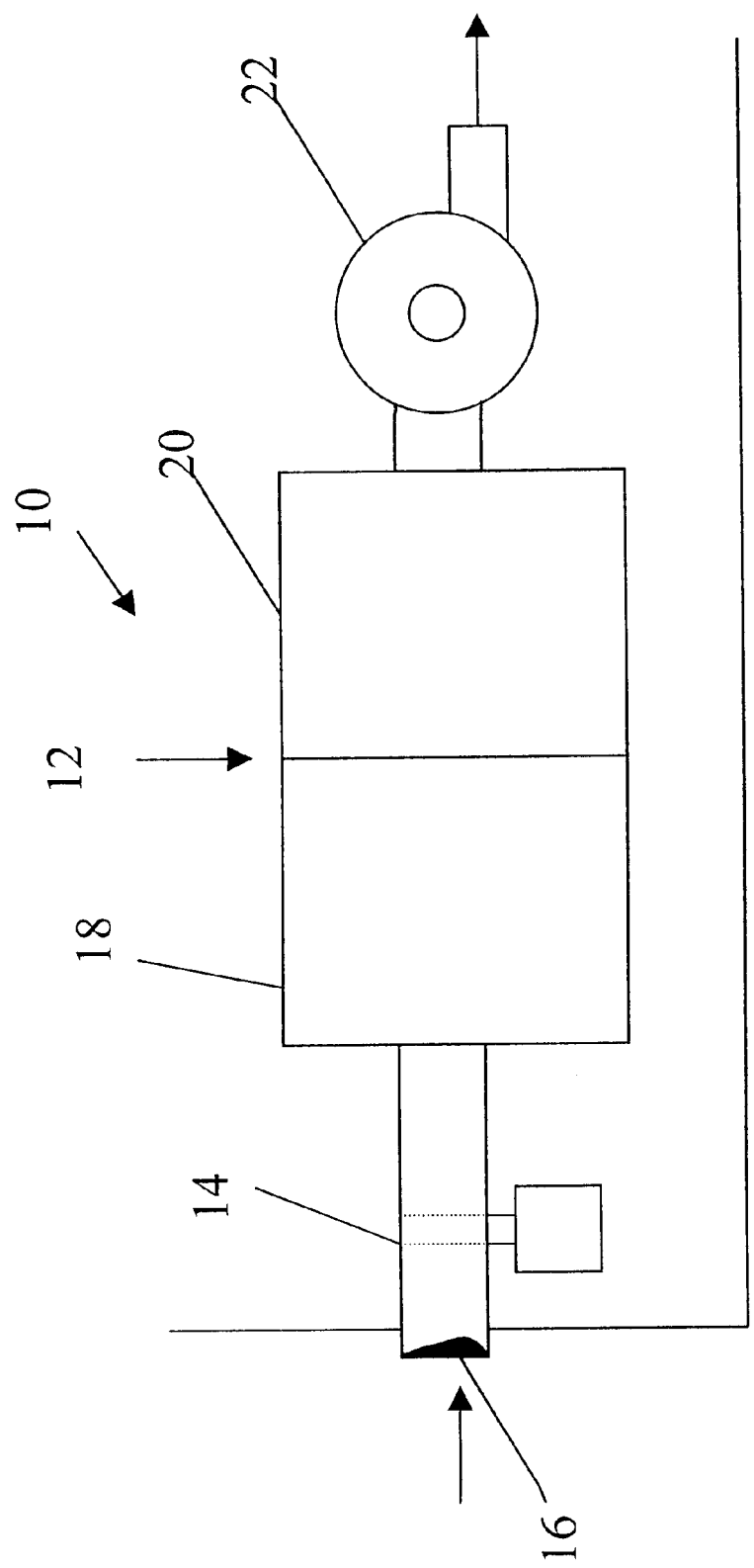
FIG. 1 is a functional block diagram of the basic embodiment of the life cell of the present invention.

Referring first to FIG. 1, the basic embodiment of the life cell 10 of the present invention is shown. The life cell 10 includes an air filtration system 12 for accepting and filtering contaminated air for use within a room, and a contaminant detector 14 for detecting the presence of contaminants within the incoming air stream.

The air filtration system 12 includes an air inlet 16 that is in fluid communication with the atmosphere outside of the room in which the life cell 10 is installed. A highly effective particular air filter 18 (hereafter "HEPA filter 18") is in fluid communication with the air inlet 16. The HEPA filter 18 accepts incoming contaminated air, removes particulate contamination, and exhausts essentially particle free air. A carbon filter 20 is in fluid communication with the air inlet 16 and the HEPA filter 18. The carbon filter 20 likewise accepts incoming contaminated air, removes predetermined chemical and contaminants, and exhausts air that has be decontaminated. Finally, a blower 22 is in fluid communication with the air inlet 16, the HEPA filter 18 and the carbon filter 20.

In operation, the blower 22 pulls contaminated air through from outside of the room into the air inlet 16. The contaminated air is analyzed by the contaminant detector 14, which detects the presence of predetermined chemical and/or biological contaminants. The contaminated air passes into the HEPA filter 18, where particles larger than a predetermined size are removed. The particle free air then passes into the carbon filter 20, where chemical contaminants are removed. The decontaminated air then passes into the blower 22 and is exhausted into the room, providing breathable air to the occupants and creating a positive pressure that prevents the ingress of contaminants into the room.

Figure 2:
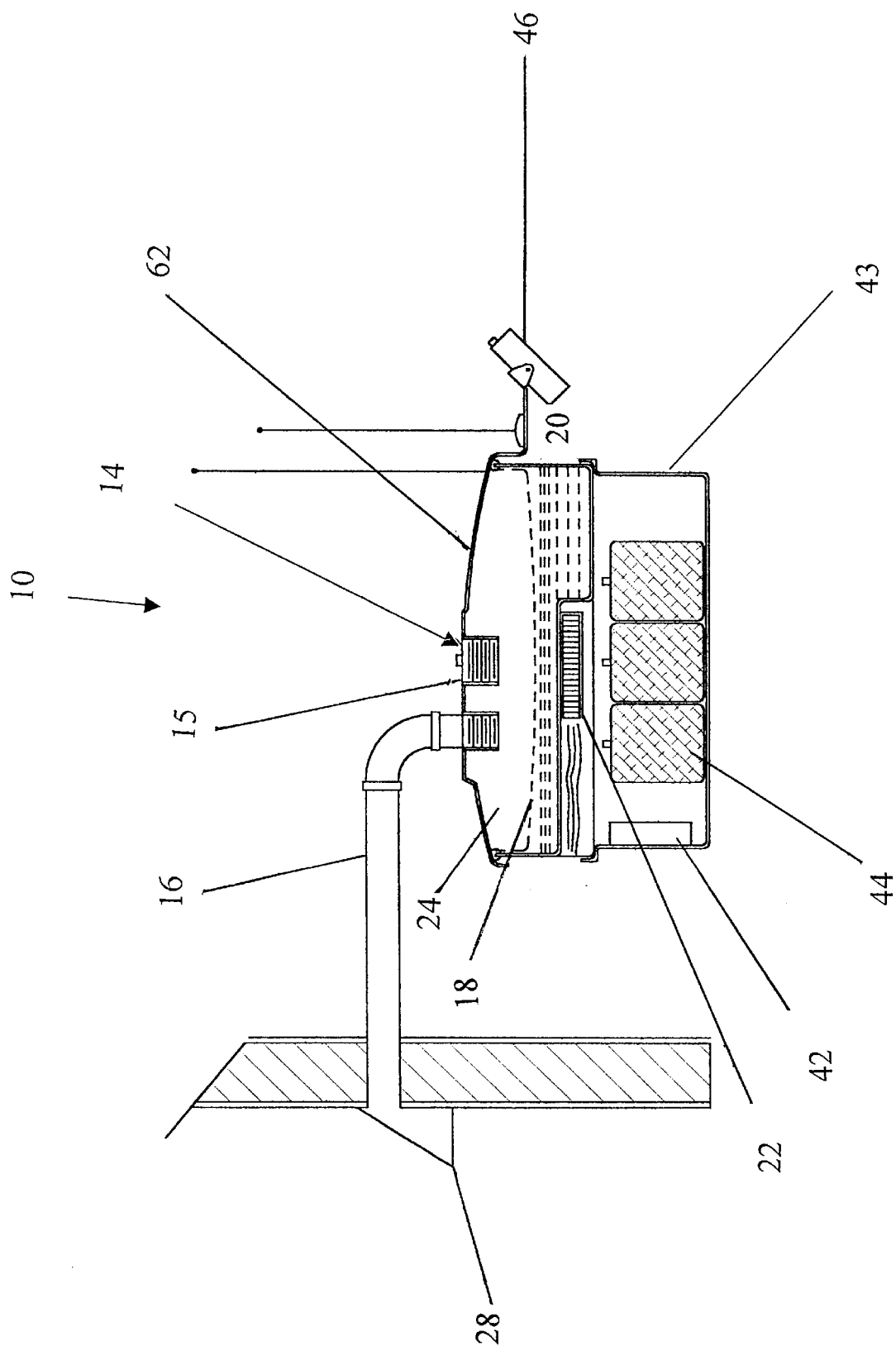
FIG. 2 is a side view of the preferred life cell of the present invention.

Referring to FIG. 2, the preferred embodiment of the life cell 10 of the present invention is shown. The air inlet 16 passes through a wall of the room and includes an inlet opening 28 through which outside air may pass. The preferred inlet opening 28 includes a rain cover to prevent water from entering the air filtration system 12 and a mesh screen to prevent the ingress of insects or small animals into the system. The air inlet 16 is preferably a flexible hose manufactured of plastic and is dimensioned to allow a fixed volume of air into the filtration system, preferably 30–60 CFM. However, in other embodiments, the flexible hose is manufactured from rubber, steel, or other art recognized duct materials.

The contaminated air then travels through the air inlet 16 and is treated by the filter 18. The HEPA filter 18 is of a predetermined size and removes particles from the air by moving the air such that particles are caused to drop from the air and be collected in a HEPA filter bag 24. The preferred HEPA filter 18 is a coated felt material. However, it is recognized that other HEPA filters may be substituted to achieve similar results. The HEPA filter 18 is specifically designed to operate in very heavy dust/fallout conditions, where the HEPA filter 18 physically removes dust and airborne contaminants larger then 0.3 microns from the air. Accordingly, the HEPA filter is adapted to remove biological contaminants carried in aerosol form.

In this preferred embodiment the contaminant detector 14 is integrated into the air intake of the HEPA filter 18. The preferred contaminant detector 14 utilizes a standard US ARMY M251A chemical agent card. This card is inserted and secured within a detector access port 15 through with the user may view the chemical agent detector cards to determine the presence of a chemical agent within the incoming air stream. However, it is recognized that other embodiments may employ other art recognized contaminant detectors to achieve similar results.

Figure 3:
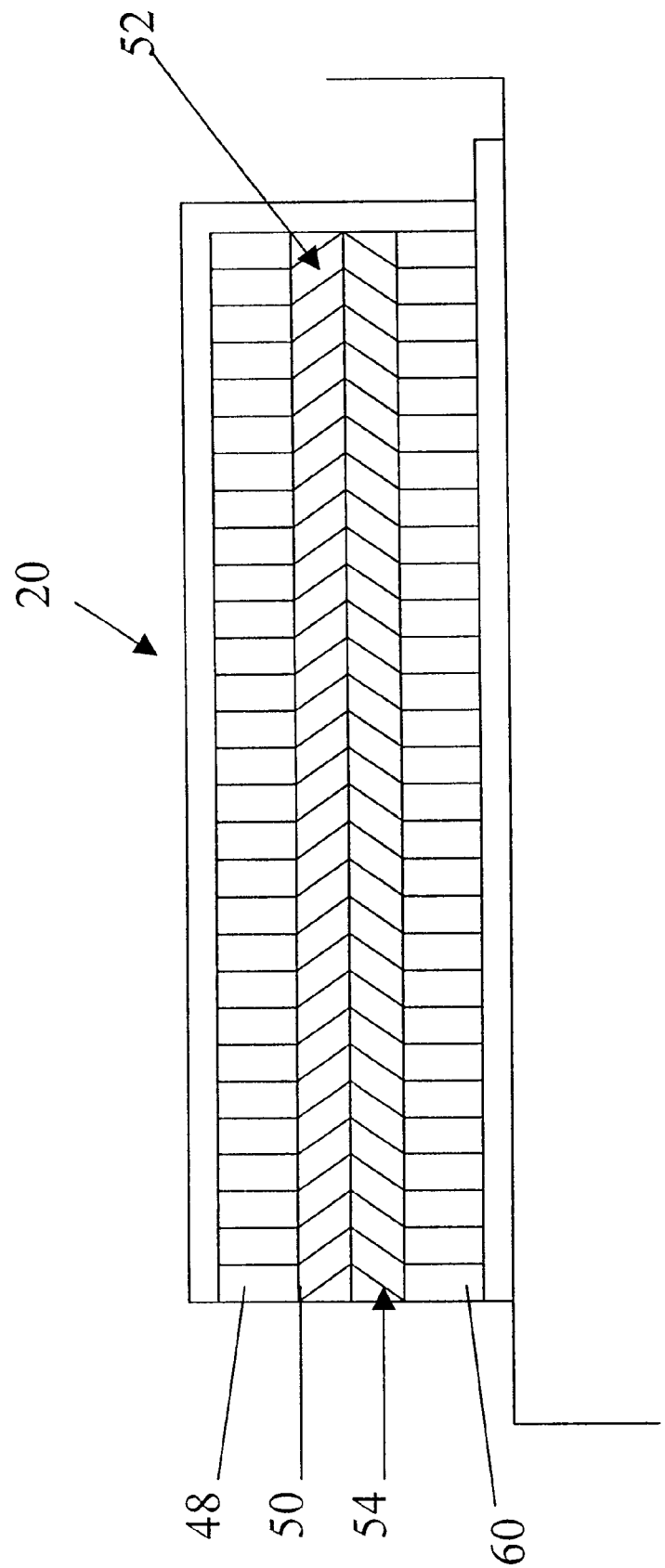
FIG. 3 is a section view of the preferred carbon filter.

Once contaminant particles are removed from the air by the HEPA filter 18, the essentially particle free air is drawn into the carbon filter 20. Referring now to FIG. 3, the preferred carbon filter 20 includes an activated carbon layer 52 and a Whetlerite carbon layer 54, separated by paper filter cloth 50, and layered one on top of the other. An open cell foam is located at both the top and the bottom of the carbon filter 20 and a layer of paper filter cloth 50 separates the activated carbon filter 52 and the Whetlerite carbon filter 54 from the open cell foam 48 and 60 layers.

In the preferred embodiment, the open cell foam layers 48, 60 are 1 inch thick, ⅛ inch diameter, open cell foam that allow air to pass evenly into and out of the carbon filter 20. The purpose of the open cell foam is to distribute air evenly under both carbon beds. It must have large open cell pores to allow air to pass with minimal air restriction or pressure loss. In other embodiments, open cell foam 48, treated with antibiotic or antibacterial agent which kills the biological contaminants, is utilized.

The activated carbon filter 52 removes harmful organic compounds, radioactive iodine gas, chemical warfare agents, microorganisms and biological warfare agents from the contaminated air. The preferred activated carbon filter 52 includes a bed of activated carbon, such as is distributed by Barneby and Suttcliff in Columbus, Ohio. However, other brands or types of activated carbon may be substituted to achieve similar results. The activated carbon is preferably in the form of granules about the size of coarse salt, known as 6×12 mesh. The activated carbon filter 52 is capable of removing radioactive iodine gas.

The Whetlerite carbon filter 54 is located adjacent to the activated carbon filter 52 and removes chemical warfare agents from the air. Only one company in the world, Calgon Corp., makes such a Whetlerite carbon that will remove chemical warfare agents. The Whetlerite carbon adsorbs gaseous chemical warfare agents such as Blister Gas (CX), also known as Phosgene Oxime, Blood Gas (AC) known as Cyanogen Chloride, Choking Gas (CG) is also known as Phosgene, Mustard Gas (HD), Nerve Gas known as Tabun (GA), Sarin (GB), Somani (GD), (VR55), VX etc. Tear Gas (CS, CN) and vomiting gas (DM). This second carbon filter serves to ensure the air that is blown into the closed air room is fully clean and breathable.

In order for the carbon filter 20 to effectively remove chemical and radioactive contaminants, the contaminated air must remain in contact with the filter for a predetermined length of time. The predetermined length of time commonly referred to as a residence time is 0.33 seconds using current carbon filter technology. However, it is understood that faster acting filters may be developed and, accordingly, this residence time may be reduced in future embodiments.

As shown in FIG. 3, the foam layers 48, 60, activated carbon filter 52 and Whetlerite carbon filter 54 are arranged in parallel relation to one another in a single filter arrangement. In this preferred embodiment, each layer is separated by a filter cloth 50, which is adapted to contain carbon fines from exiting the filter. However, in other embodiments the paper filter is eliminated and the foam layers 48, 60, activated carbon filter 52, and Whetlerite carbon filter 54 are disposed in separate scaled chambers. In still other embodiments, multiple layers of foam, activated carbon and/or Whetlerite carbon are disposed in parallel relation to one another to form a single filter.

Referring again to FIG. 2, the volume of contaminated air is drawn from the carbon filter 20 and then blown out of the filter area into the closed room by a blower 22. The blower establishes a positive pressure in the closed room, acting to prevent contaminated air from entering the room. In the preferred embodiment of the life cell 10 the blower 22 is a 12-volt high-pressure reverse curve motorized impeller. This preferred blower is powered by 110 amp hour deep cycle batteries and is capable exhausting 40 cubic feet per minute of filtered air into the room at up to one inch static pressure. Such an exhaust is capable of maintaining a positive pressure in a normal household space having a volume of 2500 cubic feet. However, it is recognized that other art recognized blowers may be substituted, provided that such a blower was capable of operating utilizing battery power and was sized to provide a sufficient volume of exhaust air to pressurize the desired space.

In the preferred embodiment of the life cell 10, the blower 22 is powered by 6–12 volt, 110 amp hour deep cycle batteries 44 that will supply life support for approximately 10 days. During non-disaster times, the life cell 10 is connected to 110-volt power that powers a battery charger 42. This battery charger assures the life cell 10 maintains fully charged batteries for use in the event of a disaster. In some embodiments, the batteries 44 also power an electronics package 46.

Figure 4:
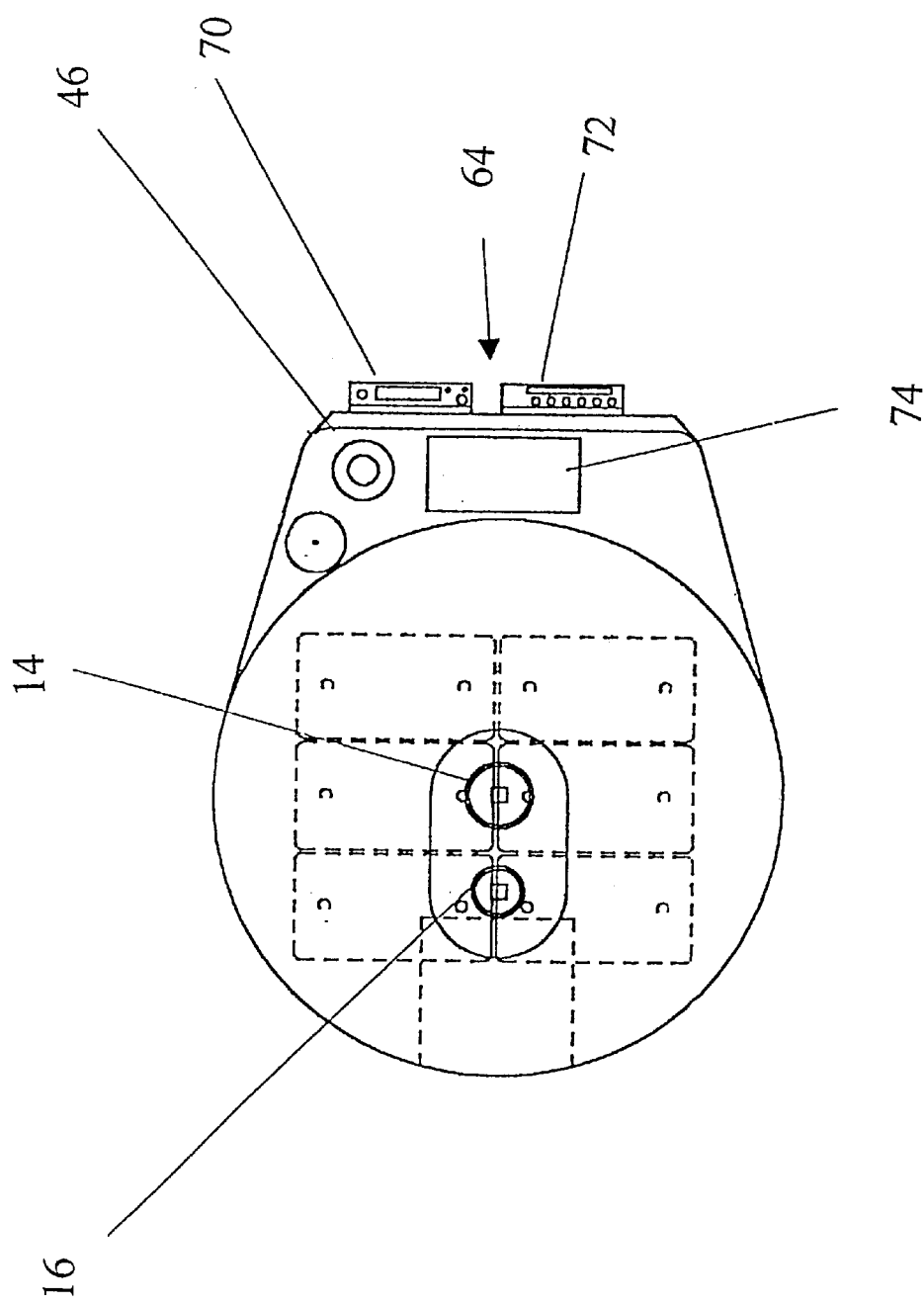
FIG. 4 is a top view of the preferred embodiment of the life cell showing an electronics package.

Referring now to FIG. 4, the preferred embodiment of the life cell 10 includes an electronics package 46 that allows the user to receive and/or transmit communication. In a real life situation where weapons of mass destruction would be used, communications are critical to maintaining psychological stability. For this reason, the preferred life cell 10 includes a radio 70 to allow people to listen to all the federal and state emergency stations. Such a radio may be a simple AM/FM type radio or emergency band scanner 72. However, the preferred radio is a CB radio or a short wave radio capable of receiving and sending radio signals. In other embodiments, other electronic devices, such as television sets, compact disc and/or cassette players are also included. Some embodiments include headphones for private listening. The preferred electronics package 64 also includes a battery-powered light 74, such as a 120 V fluorescent light. However, other embodiments include fluorescent lights from 12 volts to 48 volts, multiple lights, detachable lights and extension lights.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A air filtration system for removing contaminants from a volume of air comprising:
    an air inlet;
    a highly effective particular air filter in fluid communication with said air inlet for removing particulate contaminants from said volume of air;
    a carbon filter in fluid connection with said highly effective particular air filter for removing chemical and radioactive iodine contaminants from said volume of air, said carbon filter comprising;
       at least one layer of open cell foam;
       a layer of activated carbon; and
       a layer of Whetlerite carbon, and
    a blower in fluid communication with said carbon filter and said highly effective particular air filter, wherein said blower draws said volume of fair from said air inlet, through said highly effective particular air filter and said carbon filter, and exhausts said volume of air such that a positive pressure is created.

2. The air filtration system as claimed in claim 1 wherein said carbon filter further comprises a layer of filter cloth disposed between each of said layer of open cell foam, said layer of activated carbon, and said layer of Whetlerite carbon.

3. The air filtration system as claimed in claim 2 wherein said at least one layer of open cell foam of said carbon filter comprises two layers of open cell foam.

4. The air filtration system as claimed in claim 1 wherein said carbon filter removes contaminants chosen from a group consisting of chemical warfare agents, radioactive iodine gas.

5. The air filtration system as claimed in claim 1 wherein said highly effective particular air filter removes particulates greater than 0.3 microns.

6. A life cell for use in a disaster comprising:
    an air filtration system for removing, contaminants from a volume of air comprising:
       an air inlet;
       a highly effective particular air filter in fluid communication with said air inlet for removing particulate contaminants from said volume of air;
       a carbon filter in fluid connection with said highly effective particular air filter for removing chemical and biological contaminants from said volume of air, and
       a blower in fluid communication with said carbon filter and said highly effective particular air filter, wherein said blower draws said volume of air from said air inlet, through said highly effective particular air filter and said carbon filter, and exhausts said volume of air such that a positive pressure is created; and
    a contaminant detector in fluid communication with said air inlet of said air filtration system for detecting a predetermined contaminant in said volume of air.

7. The life cell as claimed in claim 6 wherein said carbon filter comprises:
    at least one layer of open cell foam;
    a layer of activated carbon; and
    a layer of Whetlerite carbon.

8. The life cell as claimed in claim 7 wherein said carbon filter further comprises a layer of filter cloth disposed between each of said layer of open cell foam, said layer of activated carbon, and said layer of Whetlerite carbon.

9. The life cell as claimed in claim 8 wherein said at least one layer of open cell foam of said carbon filter comprises two layers of open cell foam.

10. The life cell as claimed in claim 7 wherein said carbon filter removes contaminants chosen from a group consisting of chemical warfare agents, radioactive iodine gas.

11. The life cell as claimed in claim 7 wherein said highly effective particular air filter removes particulates greater than 0.3 microns.

12. The life cell as claimed in claim 6 wherein said contaminant detector comprises a contaminant detector card and a view port for viewing said contaminant detector card.

13. The life cell as claimed in claim 6 further comprising an electronics package.

14. The life cell as claimed in claim 13 wherein said electronics package comprises a two-way radio.

15. The life cell as claimed in claim 13 wherein said electronics package comprises a scanner.

16. The life cell as claimed in claim 6 further comprising at least one battery.

17. The life cell as claimed in claim 16 wherein said at least one battery is a 12 volt, 110 amp-hour deep cycle battery.

18. The life cell as claimed in claim 16 further comprising a battery charger in electrical communication with said at least one battery.

19. The life cell as claimed in claim 16 further comprising at least one light in electrical communication with said at least one battery.

20. The life cell as claimed in claim 19 wherein said light is a 12 volt fluorescent light.

* * * * *